(12) United States Patent
Bhandari et al.

(10) Patent No.: US 10,139,702 B2
(45) Date of Patent: Nov. 27, 2018

(54) WAVELENGTH CONVERSION DEVICE

(71) Applicant: SHIMADZU CORPORATION, Nakagyo-Ku, Kyoto-Shi, Kyoto (JP)

(72) Inventors: Rakesh Bhandari, Kyoto (JP); Koji Tojo, Kyoto (JP); Naoya Ishigaki, Kyoto (JP); Shingo Uno, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 15/763,354

(22) PCT Filed: Oct. 6, 2015

(86) PCT No.: PCT/JP2015/078290
§ 371 (c)(1),
(2) Date: Mar. 26, 2018

(87) PCT Pub. No.: WO2017/060967
PCT Pub. Date: Apr. 13, 2017

(65) Prior Publication Data
US 2018/0275487 A1   Sep. 27, 2018

(51) Int. Cl.
*G02F 1/37* (2006.01)
*H01S 3/109* (2006.01)
(Continued)

(52) U.S. Cl.
CPC ............... *G02F 1/37* (2013.01); *H01S 3/109* (2013.01); *H01S 3/113* (2013.01); *G02F 2001/354* (2013.01)

(58) Field of Classification Search
CPC ....... G02F 1/37; G02F 2001/354; H01S 3/109
See application file for complete search history.

(56) References Cited

U.S. PATENT DOCUMENTS

| 5,394,413 A * | 2/1995 | Zayhowski | G01N 21/63 372/10 |
| 6,614,584 B1 * | 9/2003 | Govorkov | G02F 1/3544 359/328 |

(Continued)

FOREIGN PATENT DOCUMENTS

| JP | 9-308755 | 9/1997 |
| JP | 2006-330518 | 12/2006 |

(Continued)

OTHER PUBLICATIONS

PCT/JP2015/078290, International Search Report and Written Opinion, dated Dec. 22, 2015, 2 pages—English, 7 pages—Japanese.
(Continued)

*Primary Examiner* — Daniel Petkovsek
(74) *Attorney, Agent, or Firm* — Andrew F. Young, Esq.; Lackenbach Siegel, LLP

(57) ABSTRACT

A wavelength conversion device having an excitation source 1, a laser medium 3 between an input mirror 5a and an output mirror 5b, consisting of an optic resonator. A laser beam is excited by the excitation light from the excitation source; a saturable absorber 4 is between the input mirror and the output mirror and increases a transmittance along with an absorption of the laser beam from the laser medium. A wavelength conversion element converts a fundamental wave of the laser light from the output mirror to a higher harmonic. A control element generates a phase-matched signal to adjust the phase-matching between the fundamental wave and the higher harmonic based on the output from the wavelength conversion element and the laser output setting value, and controls the laser output by outputting the phase-matched signal to the wavelength conversion element.

8 Claims, 3 Drawing Sheets

(51) Int. Cl.
H01S 3/113 (2006.01)
G02F 1/35 (2006.01)

(56) References Cited

U.S. PATENT DOCUMENTS

| | | | | |
|---|---|---|---|---|
| 7,778,292 | B2* | 8/2010 | Suzuki | B23K 26/0066 |
| | | | | 372/21 |
| 9,203,210 | B2* | 12/2015 | Taira | H01S 3/1643 |
| 9,429,850 | B2* | 8/2016 | Takada | H01S 3/06758 |
| 9,720,301 | B2* | 8/2017 | Sugihara | G02F 1/37 |
| 2008/0013574 | A1* | 1/2008 | Furuya | H01S 3/0675 |
| | | | | 372/6 |
| 2008/0037600 | A1* | 2/2008 | Ma | G02F 1/3501 |
| | | | | 372/21 |
| 2008/0056642 | A1* | 3/2008 | Byer | G02B 6/4296 |
| | | | | 385/27 |
| 2018/0123310 | A1* | 5/2018 | Bhandari | H01S 3/0912 |

FOREIGN PATENT DOCUMENTS

| | | |
|---|---|---|
| JP | 2007-294498 | 11/2007 |
| JP | 2009-31684 | 2/2009 |
| JP | 2015-84390 | 4/2015 |

OTHER PUBLICATIONS

PCT/JP2015/078290, Notification of Transmittal of Translation of the Written Opinion of the Preliminary Report on Patentability, dated Apr. 19, 2018, 7 pages—English.

* cited by examiner

WAVELENGTH CONVERSION DEVICE

CROSS REFERENCE TO RELATED APPLICATIONS

This application relates to, and claims priority from Ser. PCT/JP2015/078290 filed Oct. 6, 2015, the entire contents of which are incorporated herein by reference.

FIGURE SELECTED FOR PUBLICATION

FIG. 1

BACKGROUND OF THE INVENTION

Field of the Invention

The present invention relates to a wavelength conversion device utilizing a passive Q-switch laser that is applied to a spectroscopy, a laser machining device and a laser lighting device.

Description of the Related Art

FIG. 3 is a schematic view illustrating a structure of the wavelength conversion device using a conventional passive Q-switch laser. Such wavelength conversion device comprises a passive Q-switch laser 10 and a wavelength conversion unit 20.

The passive Q-switch laser 10 emits a laser light consisting of an output pulse by laser oscillation using a laser diode for excitation (pumping), a lens, a laser medium, and two mirrors that is in-place to sandwich a saturable absorber, a laser medium and a laser absorber. The wavelength conversion unit 20 converts a fundamental wave of the laser light from the passive Q-switch laser 10 to a higher harmonic.

On the other hand, the excitation (pump) power of the laser diode controls the pulsed output energy of the Q-switch laser (passive Q-switch laser).

Whereas, in the case of the passive Q-switch laser 10, the pulsed output energy is approximately constant, and the repetition frequency varies when the pump power varies. Accordingly, a ND (neutral density) filter or a continuous-variable ND filter wheel 30 that equally absorbs lights controls the laser output of the wavelength conversion device using the passive Q-switch laser.

In addition, the technology, for example, disclosed in the Patent Document 1 is known as the conventional technology.

RELATED PRIOR ART DOCUMENTS

Patent Document

Patent Document 1: JP Patent Published 2007-294498 A1

ASPECTS AND SUMMARY OF THE INVENTION

Objects to be Solved

However, the following problems to be solved remain when the ND filter or the continuous-variable ND filter wheel 30 is applied.

Specifically, the laser output must be measured and the position of the continuous-variable ND filter wheel 30 must be determined while manually moving the continuous-variable ND filter wheel 30.

In addition, in the case of a laser having a high-power peak, the ND filter or the continuous-variable ND filter wheel 30 is damaged in a short period. A damage threshold of the reflection-type ND filter is larger than that of the transmission-type ND filter, but the reflection-type ND filter is also damaged when the laser having a few hundred KW power peak.

In addition, in the case of the reflection-type ND filter or the continuous-variable ND filter wheel 30, the reflected laser may be reflected from the other material, so that the attenuation thereof must be satisfactorily carried out.

The purpose of the present invention is to provide a wavelength conversion device that control the laser output automatically and can control the laser output without absorbing or reflecting the laser.

Means for Solving the Problem

For solving the above problems, a wavelength conversion device of the present invention comprises: an excitation source that is excited at a repetition frequency and emits an excitation light; a laser medium that is in-place between an input mirror and an output mirror that consist of an optic resonator, and emits a laser beam excited by the excitation light from the excitation source; a saturable absorber that is in-place between the input mirror and the output mirror and increases a transmittance thereof along with an absorption of the laser beam from said laser medium; a wavelength conversion element that converts a fundamental wave of the laser light from the output mirror to a higher harmonic; and a control element that generates a phase-matched signal to adjust the phase-matching between the fundamental wave and the higher harmonic based on the output from the wavelength conversion element and the laser output setting value, and controls the laser output by outputting the phase-matched signal to the wavelength conversion element.

Effect of the Invention

According to the aspect of the present invention, the control element generates the phase-matched signal to adjust the phase-matching between the fundamental wave and the higher harmonic based on the output from the wavelength conversion element and the laser output setting value and controls the laser output by outputting the phase-matched signal to the wavelength conversion element.

Accordingly, the laser output automatically can be controlled, the laser output can be controlled without absorbing or reflecting the laser, so that the material is not damaged and no dangerousness due to the reflection light exists.

The above and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
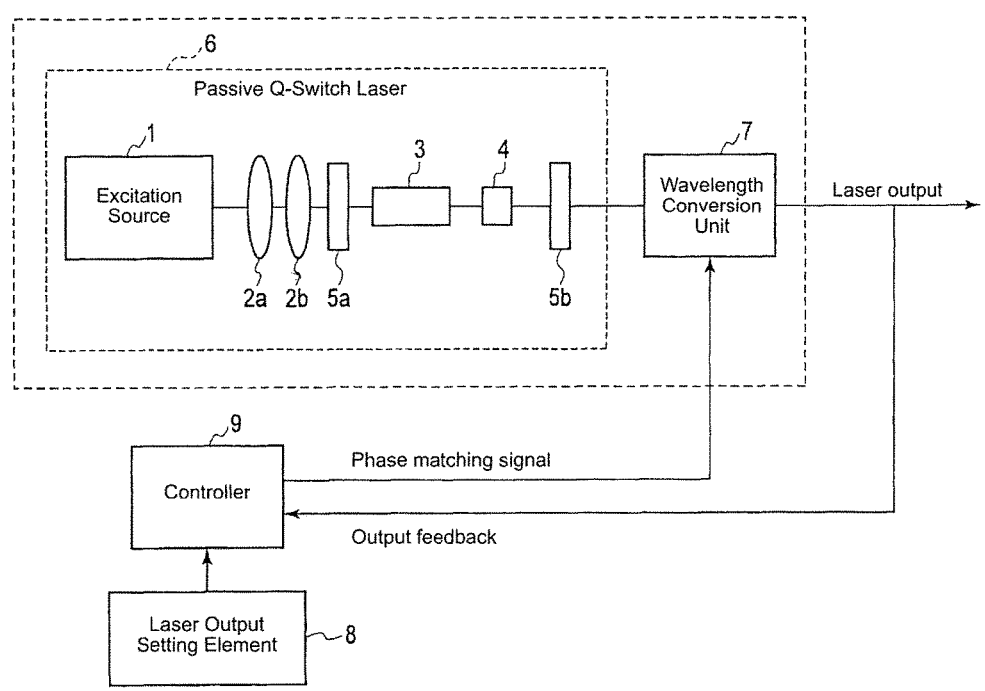
FIG. 1 is a diagram illustrating a wavelength conversion device according to the aspect of the Embodiment 1 of the present invention.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent.

Hereinafter, referring to FIGs., the inventor sets forth further detail of a wavelength conversion device using the passive Q-switch laser according to the aspect of the Embodiment of the present invention. FIG. 1 is a diagram illustrating the wavelength conversion device according to the aspect of the Embodiment 1 of the present invention.

The wavelength conversion device comprises the passive Q-switch laser 6, the wavelength conversion unit 7, the laser output setting element 8 and the controller 9.

The passive Q-switch laser 6 comprises the excitation source 1, the lenses 2a, 2b, the input mirror 5a, the laser medium 3, the saturable absorber 4 and the output mirror 5b. The optical resonator comprises the input mirror 5a, the laser medium 3, the saturable absorber 4, and the output mirror 5b.

The excitation source 1 comprises the laser diode for excitation (pumping), and outputs the excitation light, which is excited by the laser diode to the lens 2a. The lenses 2a, 2b converge the excitation light from the excitation source 1, and outputs to the laser medium 3.

The laser medium 3 comprises e.g., the rare-earth dope YAG, $YVO_4$, or $GdVO_4$, and is in-place between the input mirror 5a and the output mirror 5b. The mirror 5a that is installed to one end of the laser medium 3 transmits the excitation light and reflects the laser beam with the high reflectance. The mirror 5b partially transmits a part of the laser lights and reflects the rest thereof.

The saturable absorber 4 is in-place between the mirror 5a and the mirror 5b and increases the light transmission along with absorption of the laser beam from the laser medium 3. The saturable absorber 4 becomes transparent when the electron density in the excited level is saturated and the Q-value of the light resonator rapidly increases, and laser oscillation takes place and the pulsed light is emitted. The saturable absorber 4 comprises e.g., Cr:YAG.

The wavelength conversion unit 7 that corresponds to the wavelength conversion element of the present invention converts the fundamental wave of the laser light from the output mirror 5b to a higher harmonic, and outputs the higher harmonic.

The laser setting element 8 consists of a keyboard, a mouse and a touch panel and so forth, and specifies the laser output setting value. The controller 9 consists of a microcomputer and inputs the laser output setting value that the laser output setting element 8 specifies.

The controller 9 that corresponds to the control element of the present invention generates the phase-matched signal to adjust the phase-matching between the fundamental wave and the higher harmonic by comparing the laser output from the wavelength conversion unit 7 to the laser output setting value and controls the laser output by outputting the phase-matched signal to the wavelength conversion unit.

In such way, according to the passive Q-switch laser of the Embodiment 1, the passive Q-switch laser 6 emits the laser light consisting of the output pulse by laser oscillation using the excitation source 1, the lenses 2a, 2b, the laser medium 3, the saturable absorber 4, and two mirrors 5a, 5b.

The wavelength conversion unit 7 converts the fundamental wave of the laser light from the passive Q-switch laser 6 to the higher harmonic. The controller 9 generates the phase-matched signal to adjust the phase-matching between the fundamental wave and the higher harmonic by comparing the laser output from the wavelength conversion unit 7 to the laser output setting value, and controls the laser output by outputting the phase-matched signal to the wavelength conversion unit.

Therefore, the phase-matching that is required to execute the wavelength conversion can be finely controlled. The better the phase-matching is, the better the efficiency of the wavelength conversion becomes, so that the laser output increases. The worse the phase-matching is, the worse the efficiency of the wavelength conversion becomes, so that the laser output decreases.

Accordingly, the laser output automatically can be controlled, the laser output can be controlled without absorbing or reflecting the laser, so that the material is not damaged and no dangerousness due to the reflection light exists.

Embodiment 2

Figure 2:
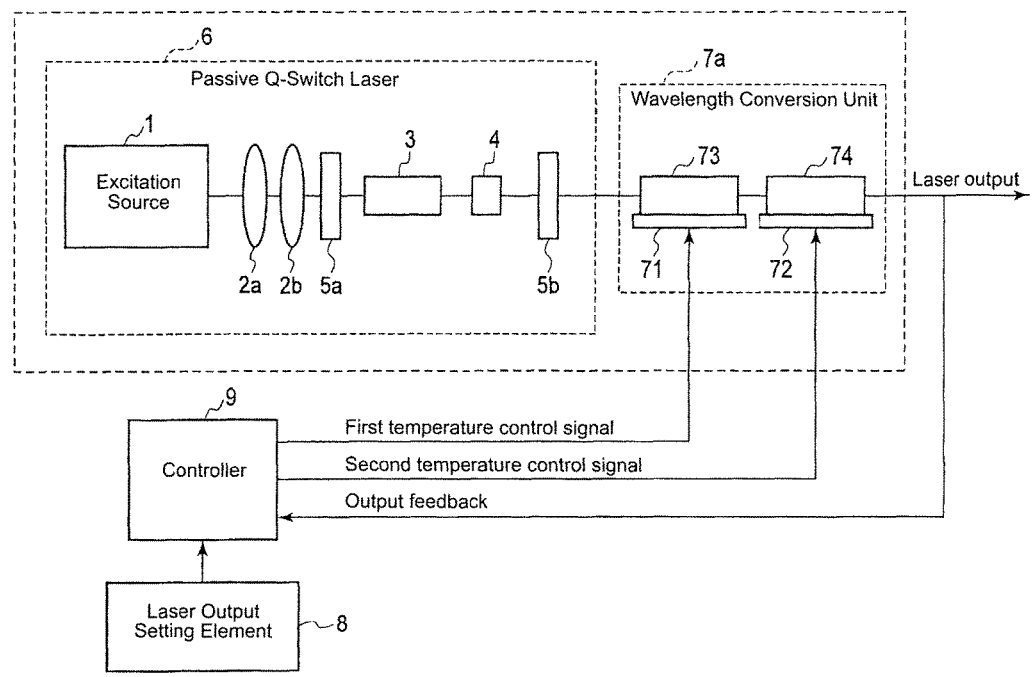
FIG. 2 is a diagram illustrating a wavelength conversion device according to the aspect of the Embodiment 2 of the present invention.
Figure 3:
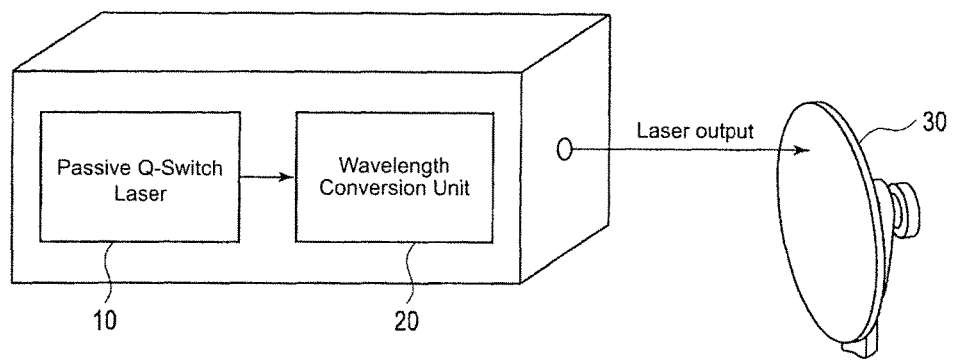
FIG. 3 is a diagram illustrating a conventional wavelength conversion device.

FIG. 2 is a diagram illustrating the wavelength conversion device according to the aspect of the Embodiment 2 of the present invention. The wavelength conversion device according to the aspect of the Embodiment 2 has a different aspect relative to the wavelength conversion unit 7a from the aspect of the wavelength conversion device according to the aspect of the Embodiment 1 referring to FIG. 1.

The wavelength conversion unit 7a comprises a first temperature adjustment element 71, a second temperature adjustment element 72, a first wavelength conversion element 73 and a second temperature adjustment element 74. The first wavelength conversion element 73 comprises LBO ($LiB_3O_5$) crystal for the SHG, and converts the fundamental wave, which is the laser light from the saturable absorber 4, to a second higher harmonic. The second wavelength conversion element 74 comprises LBO($LiB3O_5$) crystal for the THG, and converts the second higher harmonic from the first wavelength conversion element 7 and the rest of the fundamental wave to a third higher harmonic.

The first temperature adjustment element 71 comprising a Peltier element is installed to the first wavelength conversion element 73 or in-place in the periphery thereof and adjusts the temperature of the first wavelength conversion element 73 to a predetermined temperature based on a temperature control signal from the control element 9.

The second temperature adjustment element 72 comprising a Peltier element is installed to the second wavelength conversion element 74 or is in-place in the periphery thereof and adjusts the temperature of the second wavelength conversion element 74 to a predetermined temperature based on a temperature control signal from the control element 9.

In such way, relative to the passive Q-switch laser according to the aspect of the Embodiment 2, the wavelength conversion element 73 converts the fundamental wave, which is the laser light from the saturable absorber 4, to the second higher harmonic. The second wavelength conversion element 74 converts the second harmonic from the first wavelength conversion element 73 and the rest of the fundamental wave to the third harmonic.

The fundamental wave of the laser output from the mirror 5b is 1064 nm, so that the third higher harmonic of the laser output from the second wavelength conversion element 74 is 355 nm.

The controller 9 generates the temperature control signal to adjust the phase-matching by comparing the laser output from the second wavelength conversion element 74 to the laser output setting value, and controls the laser output by controlling the temperatures of the first wavelength conversion element 73 and the second wavelength conversion element 74 by outputting the temperature control signal to the first temperature control element 71 and the second temperature control element 72.

Specifically, when controlling the temperatures of the first wavelength conversion element 73 and the second wavelength conversion element 74, the refraction index of the first wavelength conversion element 73 and the second wavelength conversion element 74 changes, so that the phase thereof changes.

Therefore, the phase-matching that is required to execute the wavelength conversion can be finely controlled. The better the phase-matching is, the better the efficiency of the wavelength conversion becomes, so that the laser output increases. The worse the phase-matching is, the worse the efficiency of the wavelength conversion becomes, so that the laser output decreases.

Accordingly, the laser output automatically can be controlled, the laser output can be controlled without absorbing or reflecting the laser, so that the material is not damaged and no dangerousness due to the reflection light exists.

In addition, according to the aspect of the Embodiment 2, the second wavelength conversion element 74 converts the second higher harmonic from the first wavelength conversion element 73 to third higher harmonic, but, for example, the second wavelength conversion element may convert the second higher harmonic from the first wavelength conversion element to fourth higher harmonic. In such case, the first wavelength conversion element comprises the LBO crystal, and the second wavelength conversion element comprises the BBO crystal.

INDUSTRIAL APPLICABILITY

The present invention is applicable to a passive Q-switch laser of a spectroscopic instrument, a laser machining device, a medical device, a laser illumination and so forth.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:
1. A wavelength conversion device, comprising:
an excitation source that is excited at a repetition frequency and emits an excitation light;
a laser medium that is in-place between an input mirror and an output mirror, the laser medium comprising an optic resonator, the laser medium emitting a laser beam excited by the excitation light from said excitation source;
a saturable absorber that is in-place between said input mirror and said output mirror and increases a transmittance thereof along with an absorption of the laser beam from said laser medium;
a wavelength conversion element that converts a fundamental wave of the laser light from said output mirror to a higher harmonic; and
a control element that generates a phase-matched signal to adjust the phase-matching between said fundamental wave and said higher harmonic based on an output from said wavelength conversion element and a laser output setting value and controls the laser output by outputting said phase-matched signal to said wavelength conversion element, the phase-matched signal being generated automatically without absorbing or reflecting the laser beam.

2. The wavelength conversion device, according to claim 1, wherein:
said wavelength conversion element further comprises:
a first wavelength conversion element that converts the fundamental wave that is the laser beam from said output mirror to a second higher harmonic; and
a second wavelength conversion element that converts said second harmonic from said first wavelength conversion element and a rest of the fundamental wave to a third higher harmonic.

3. The wavelength conversion device, according to claim 2, wherein:
a temperature adjustment element is installed to said first wavelength conversion element and said second wavelength conversion element; and
said control element outputs a temperature control signal to said temperature control element as said phase-matching, and adjusts said phase-matching of said first wavelength conversion element and the second wavelength conversion element.

4. The wavelength conversion device, according to claim 1, wherein:
said wavelength conversion element further comprises:
a first wavelength conversion element that converts the fundamental wave that is the laser beam from said output mirror; and a second wavelength conversion element that converts the second higher harmonic from said first wavelength conversion element to a fourth higher harmonic.

5. The wavelength conversion device, according to claim 4, wherein:
said first wavelength conversion element comprises the LBO ($LiB_3O_5$) crystal and said second wavelength conversion element comprises a BBO ($BaB_2O_4$) crystal.

6. The wavelength conversion device, according to claim 1, wherein:

said laser medium comprises at least one rare-earth dopant selected from a group consisting of YAG, $YVO_4$, and $GdVO_4$.

7. The wavelength conversion device, according to claim 1, wherein:

said saturable absorber comprises Cr:YAG.

8. The wavelength conversion device, according to claim 1, wherein:

said wavelength conversion element comprises LBO ($LiB_3O_5$) crystal.

* * * * *